United States Patent
Chen et al.

(10) Patent No.: US 12,355,336 B2
(45) Date of Patent: Jul. 8, 2025

(54) COOLING STRUCTURE FOR DISK-TYPE ELECTRIC MOTOR, AND DISK-TYPE ELECTRIC MOTOR

(71) Applicant: SHANGHAI PANGOOD POWER TECHNOLOGY CO., LTD., Shanghai (CN)

(72) Inventors: Jinhua Chen, Jinhua (CN); Wenxiong Yang, Jinhua (CN); Guangquan Zhang, Jinhua (CN); Yixiong Li, Jinhua (CN); Lei Tang, Jinhua (CN); Li Xia, Jinhua (CN)

(73) Assignee: SHANGHAI PANGOOD POWER TECHNOLOGY CO., LTD, Shanghai (CN)

( * ) Notice: Subject to any disclaimer, the term of this patent is extended or adjusted under 35 U.S.C. 154(b) by 206 days.

(21) Appl. No.: 18/255,356

(22) PCT Filed: Sep. 18, 2021

(86) PCT No.: PCT/CN2021/119292
§ 371 (c)(1),
(2) Date: May 31, 2023

(87) PCT Pub. No.: WO2022/142497
PCT Pub. Date: Jul. 7, 2022

(65) Prior Publication Data
US 2024/0022136 A1  Jan. 18, 2024

(30) Foreign Application Priority Data

Dec. 30, 2020 (CN) .......................... 202011624555.5

(51) Int. Cl.
*H02K 9/19* (2006.01)
*H02K 1/20* (2006.01)
(Continued)

(52) U.S. Cl.
CPC ............... *H02K 9/19* (2013.01); *H02K 5/203* (2021.01)

(58) Field of Classification Search
CPC ...... H02K 1/20; H02K 1/2793; H02K 1/2796; H02K 1/32; H02K 3/24; H02K 3/48;
(Continued)

(56) References Cited

U.S. PATENT DOCUMENTS 8,373,316 B2 *  2/2013  Beatty ...................... H02K 3/24
                                                              310/52
11,942,828 B2 *  3/2024  Zhang .................... H02K 9/197
(Continued)

FOREIGN PATENT DOCUMENTS

CN       102790473 A    11/2012
CN       109474092 A    3/2019
(Continued)

OTHER PUBLICATIONS

International Search Report with English translation and Written Opinion of PCT/CN2021/119292, Dec. 1, 2021, 13 sheets.
(Continued)

*Primary Examiner* — Edgardo San Martin
(74) *Attorney, Agent, or Firm* — Womble Bond Dickinson (US) LLP

(57) ABSTRACT

A cooling structure for a disk electric motor, and a disk electric motor are provided. The cooling structure includes: a stator core, a stator housing, multiple first baffles and multiple second baffles. Multiple coils are arranged on the stator core, and there is a gap between adjacent ones of the coils; a stator housing enclosing two end faces of the stator core, where a first cavity is defined by the stator housing and an outer side of the stator core, a second cavity is defined by the stator housing and an inner side of the stator core, where the first cavity and the second cavity are in communication
(Continued)

with each other through the gap, and a liquid inlet and a liquid outlet which are in communication with the first cavity are arranged on the stator housing.

16 Claims, 4 Drawing Sheets

(51) Int. Cl.
  *H02K 3/24* (2006.01)
  *H02K 3/487* (2006.01)
  *H02K 5/20* (2006.01)
(58) Field of Classification Search
  CPC ............ H02K 3/487; H02K 3/32; H02K 3/34; H02K 3/345; H02K 5/20; H02K 5/203; H02K 9/19; H02K 9/193; H02K 9/197; H02K 21/24; H02K 2201/12; H02K 2205/09
  See application file for complete search history.

(56) References Cited

U.S. PATENT DOCUMENTS

| | | | | |
|---|---|---|---|---|
| 2013/0313939 | A1* | 11/2013 | Hiramitsu | H02K 3/522 310/195 |
| 2021/0167668 | A1* | 6/2021 | Carter | H02K 3/325 |
| 2023/0396105 | A1* | 12/2023 | Tang | H02K 5/15 |
| 2024/0136876 | A1* | 4/2024 | Zhang | H02K 1/2795 |

FOREIGN PATENT DOCUMENTS

| | | | | |
|---|---|---|---|---|
| CN | 109510341 | A | | 3/2019 |
| CN | 208986739 | U * | | 6/2019 |
| CN | 209434975 | U | | 9/2019 |
| CN | 209434977 | U * | | 9/2019 ............ H02K 1/165 |
| CN | 209434978 | U | | 9/2019 |
| CN | 209526575 | U * | | 10/2019 |
| CN | 211018428 | U | | 7/2020 |
| CN | 111725909 | A | | 9/2020 |
| CN | 111725939 | A * | | 9/2020 ............ H02K 1/165 |
| CN | 112671125 | A * | | 4/2021 ............... H02K 1/20 |
| CN | 213185656 | U * | | 5/2021 |
| CN | 213185657 | U * | | 5/2021 |
| CN | 213185658 | U * | | 5/2021 |
| CN | 214154224 | U * | | 9/2021 ............ H02K 1/182 |
| CN | 115498791 | A * | | 12/2022 ............... H02K 1/20 |
| CN | 108551235 | B * | | 9/2024 ............... H02K 1/20 |
| CN | 119134731 | A * | | 12/2024 |
| CN | 222234504 | U * | | 12/2024 |
| EP | 1 045 505 | A2 | | 10/2000 |
| EP | 3913777 | A1 * | | 11/2021 ............ H02K 1/165 |
| JP | 2005-348589 | A | | 12/2005 |
| JP | 2006-14564 | A | | 1/2006 |
| JP | 2020195180 | A | | 12/2020 |
| KR | 10-2020-0097419 | A | | 8/2020 |

OTHER PUBLICATIONS

European Search Report for Application No. 21913242.0, dated Oct. 4, 2024, 9 pages.

* cited by examiner

COOLING STRUCTURE FOR DISK-TYPE ELECTRIC MOTOR, AND DISK-TYPE ELECTRIC MOTOR

The present application is a national phase application of International application No. PCT/CN2021/119292. Filed on Sep. 18, 2021, which claims priority to Chinese patent application No. 202011624555.5, titled "COOLING STRUCTURE FOR DISK-TYPE ELECTRIC MOTOR, AND DISK-TYPE ELECTRIC MOTOR", filed on Dec. 30, 2020, which are incorporated herein by reference in their entireties.

FIELD

The present application relates to the technical field of heat dissipation of a disc electric motor, and in particular to a cooling structure for a disc electric motor, and a disc electric motor.

BACKGROUND

In order to improve the working efficiency of a disc electric motor, a cooling system is designed for the disc electric motor. There are two cooling systems. One is air cooling, and the other is liquid cooling. The liquid cooling brings higher efficiency than air cooling. The conventional liquid cooling system mainly runs in an external cooling mode in which coolant contacts indirectly with to-be-cooled parts, which causes a low cooling efficiency, thereby affecting the service life of the disc electric motor.

Therefore, how to prolong the service life of the disc electric motor has attracted the attention of those skilled in the art.

SUMMARY

An object of the present application is to provide a cooling structure for a disc electric motor to prolong the service life of the disc electric motor.

In order to achieve the above object, a cooling structure for a disc electric motor is provided according to the present application. The cooling structure includes:
- a stator core, where multiple coils are arranged on the stator core, and there is a gap between adjacent ones of the multiple coils;
- a stator housing enclosing two end faces of the stator core, where a first cavity is defined by the stator housing and an outer side of the stator core, a second cavity is defined by the stator housing and an inner side of the stator core, where the first cavity and the second cavity are in communication with each other through the gap, and a liquid inlet and a liquid outlet which are in communication with the first cavity are arranged on the stator housing; and
- multiple first baffles and multiple second baffles, where one of the first baffles is arranged in one of the gaps, one of the second baffles is arranged in another of the gaps, an oil guide groove is arranged at the bottom of the gap provided with the first baffle, and one or more of the first baffles are spaced between adjacent ones of the second baffles;
- where a circulation channel is formed by one or more oil guide grooves arranged between two adjacent ones of the second baffles; where the multiple second baffles separate the first cavity and the second cavity into at least one circulation channel; where in one of the at least one circulation channel, an inlet of the circulation channel is arranged diagonally with an outlet of the circulation channel, where in an overall direction in which liquid refrigerant flows in forming multiple circulation channels, an inlet of a circulation channel, arranged at an initial end, of the multiple circulation channels is in communication with the liquid inlet, an outlet of a circulation channel, arranged at a tail end, of the multiple circulation channels is in communication with the liquid outlet, and an outlet of a circulation channel of the circulation channels is an inlet of a next circulation channel.

In an embodiment of the present application, the inlet of the circulation channel or the outlet of the circulation channel is a through hole defined in a corresponding one of the second baffles.

In an embodiment of the present application, the inlet of the circulation channel or the outlet of the circulation channel is an opening formed by a corresponding one of the baffles and an inner wall of the stator housing.

In an embodiment of the present application, a central surface of the oil guide groove coincides with a central surface of a corresponding gap of the gaps.

In an embodiment of the present application, the number of the multiple second baffles is six, six circulation channels, including a first circulation channel, a second circulation channel, a third circulation channel, a fourth circulation channel, a fifth circulation channel and a sixth circulation channel, are formed by separation of the six second baffles, an inlet of the first circulation channel is in communication with the liquid inlet, and an outlet of the sixth circulation channel is in communication with the liquid outlet.

In an embodiment of the present application, two of the first baffles are spaced between two adjacent ones of the second baffles.

In an embodiment of the present application, the liquid inlet and the liquid outlet are arranged on an outer peripheral surface of the stator housing.

In an embodiment of the present application, the stator core is a segmented core.

A disc electric motor is further provided according to the present application. The disc electric motor includes at least two cooling structures for a disc electric motor according to any one of the above aspects, in two adjacent ones of the cooling structures for a disc electric motor, a liquid outlet of a cooling structure for a disc electric motor is in communication with a liquid inlet of a next cooling structure for a disc electric motor.

In an embodiment of the present application, in the two adjacent ones of the cooling structures for a disc electric motor, the liquid outlet of the cooling structure for a disc electric motor is in communication with the liquid inlet of the next cooling structure for a disc electric motor through a high-pressure pipe.

With the cooling structure for a disc electric motor according to the present application, the liquid refrigerant sequentially enters the multiple circulation channels from the liquid inlet, and contacts directly with the outer side of the stator core or the inner side of the stator core or the oil guide groove through the circulation channels for heat exchange, and is discharged through the liquid outlet. It can be seen that in the above process, the liquid refrigerant can fully and directly contact the stator core for heat exchange to reduce the temperature of the stator core, thereby improving the heat dissipation efficiency of the stator core and prolonging the service life of the disc electric motor.

BRIEF DESCRIPTION OF THE DRAWINGS

For more clearly illustrating technical solutions in embodiments of the present application or in the conventional technology, drawings used in the description of the embodiments or the conventional technology will be briefly described hereinafter. Apparently, the drawings in the following description illustrate only some embodiments of the present application. For those skilled in the art, other drawings may be obtained based on the provided drawings without any creative efforts.

Figure 1:
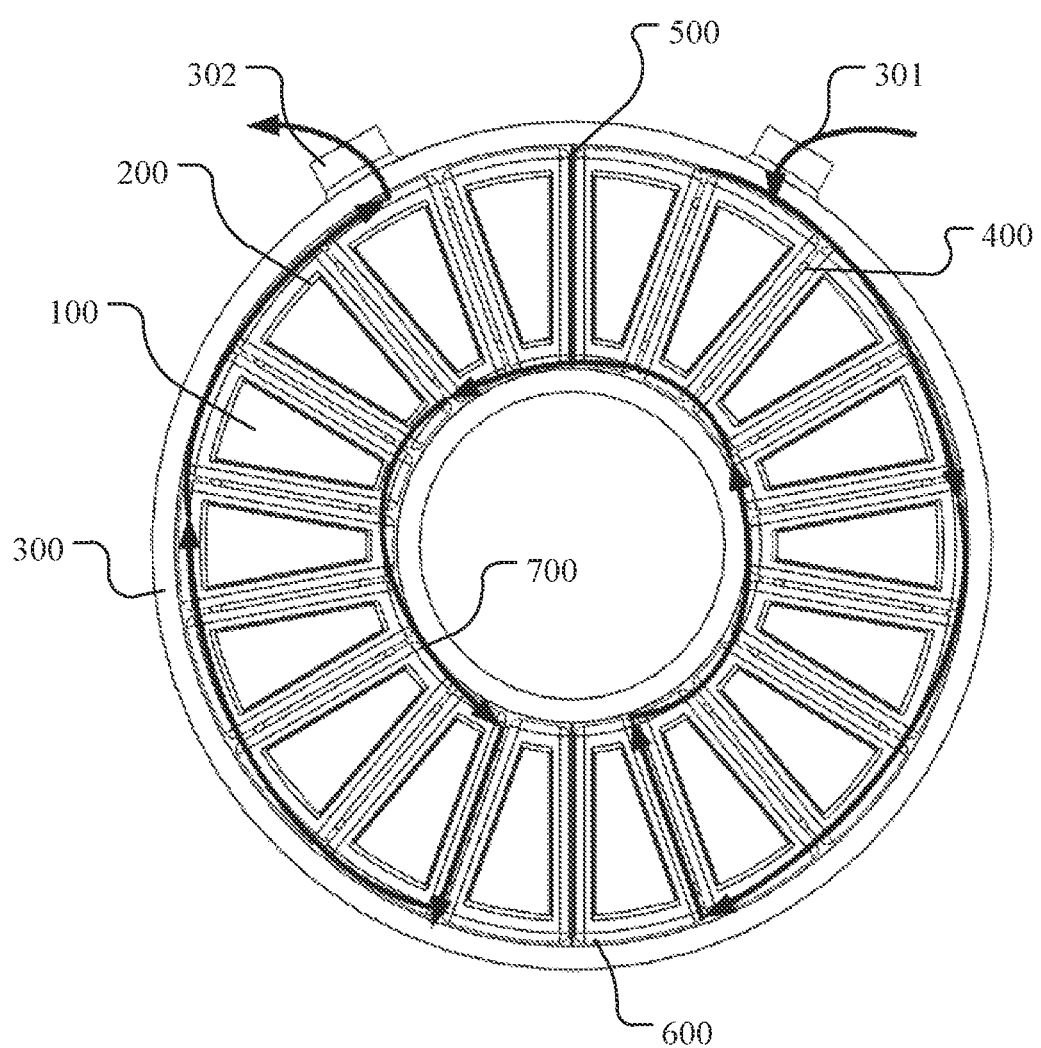
FIG. 1 is a schematic diagram of a cooling structure for a disc electric motor according to an embodiment of the present application.

Reference numerals in the figures are listed as follows: 100 stator core, 200 coil, 300 stator housing, 400 first baffle, 500 second baffle, 600 first cavity, 700 second cavity, 101 stator teeth, 102 stator slot, 103 oil guide groove, 301 liquid inlet, 302 liquid outlet, 303 outer stator housing, 304 outer stator plate, 801 first circulation channel, 802 second circulation channel, 803 third circulation channel, 804 fourth circulation channel, 805 fifth circulation channel, 806 sixth circulation channel.

DETAILED DESCRIPTION OF THE EMBODIMENTS

A core of the present application is to provide a cooling structure for a disc electric motor to prolong the service life of the disc electric motor.

In order to enable those skilled in the art to better understand technical solutions of the present application, the present application is further described in detail in conjunction with drawings and embodiments.

Figure 2:
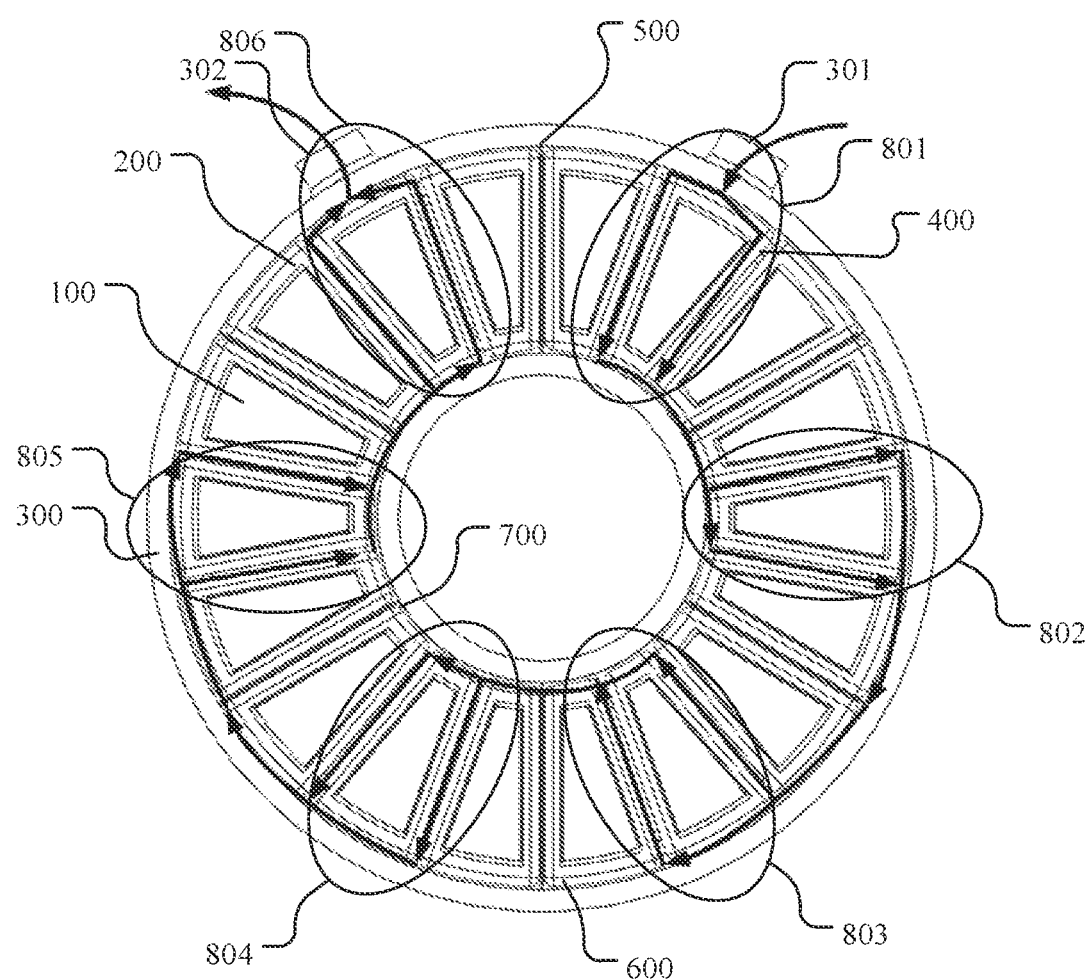
FIG. 2 is a schematic diagram of a cooling structure for a disc electric motor according to another embodiment of the present application.
Figure 3:
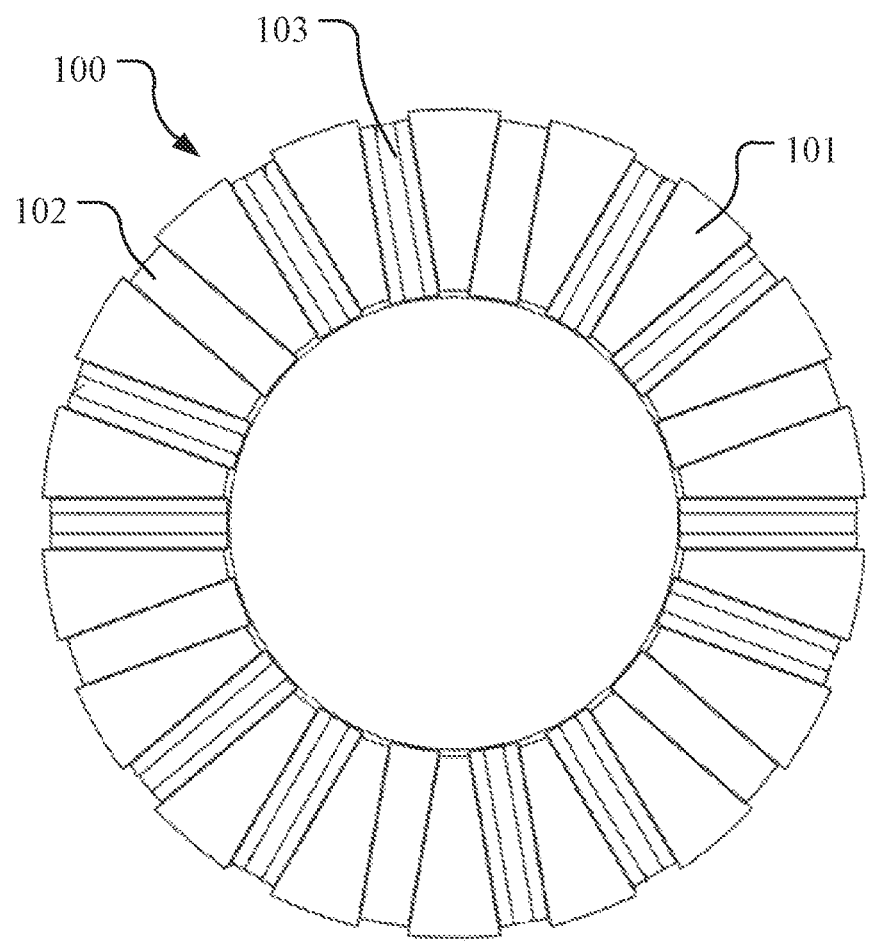
FIG. 3 is a schematic structural diagram of a stator core according to an embodiment of the present application.
Figure 4:
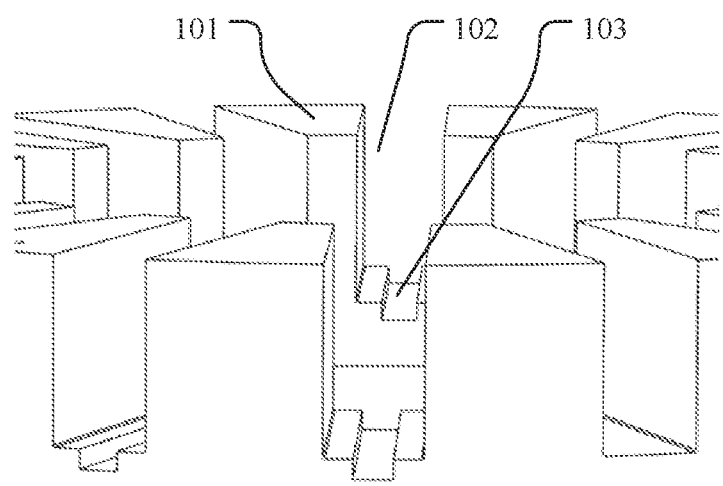
FIG. 4 is a partially enlarged schematic diagram of the stator core according to the embodiment of the present application.
Figure 5:
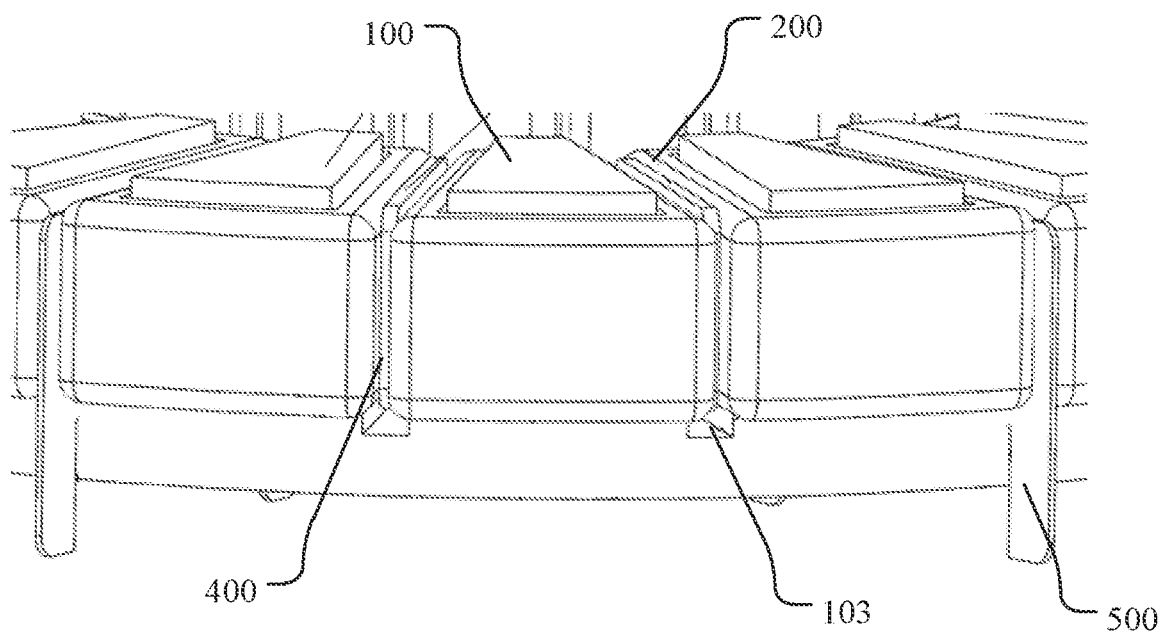
FIG. 5 is a partially enlarged schematic diagram of the cooling structure for a disc electric motor according to the embodiment of the present application.

Referring to FIG. 1 to FIG. 5, the cooling structure for a disc electric motor according to the present application includes a stator core 100, a stator housing 300, multiple first baffles 400 and multiple second baffles. Multiple coils 200 are arranged on the stator core 100, and there is a gap between adjacent ones of the multiple coils 200. The stator housing 300 encloses two end faces of the stator core 100, a first cavity 600 is defined by the stator housing 300 and an outer side of the stator core 100, and a second cavity 700 is defined by the stator housing 300 and an inner side of the stator core 100. A liquid inlet 301 and a liquid outlet 302 which are in communication with the first cavity 600 are arranged on the stator housing 300; one of the first baffles 400 is arranged in one of the gaps, one of the second baffles 500 is arranged in another of the gaps, an oil guide groove 103 is arranged at the bottom of the gap provided with the first baffle 400, one or more of the first baffles 400 are spaced between adjacent ones of the second baffles 500. A circulation channel is formed by one or more oil guide grooves 103 arranged between two adjacent ones of the second baffles 500. The multiple second baffles 500 separate the first cavity 600 and the second cavity 700 into at least one circulation channel; in one of the at least one circulation channel, an inlet of the circulation channel is arranged diagonally with an outlet of the circulation channel. In an overall direction in which liquid refrigerant flows in forming multiple circulation channels, an inlet of a circulation channel, arranged at an initial end, of the multiple circulation channels is in communication with the liquid inlet 301, an outlet of a circulation channel, arranged at a tail end, of the multiple circulation channels is in communication with the liquid outlet 302, and an outlet of a circulation channel of the circulation channels is an inlet of a next circulation channel.

With the cooling structure for a disc electric motor according to the present application, the liquid refrigerant sequentially enters THE multiple circulation channels from the liquid inlet 301, and contacts directly with the outer side of the stator core or the inner side of the stator core or the oil guide groove 103 through the circulation channels for heat exchange, and is discharged through the liquid outlet 302. It can be seen that in the above process, the liquid refrigerant can fully and directly contact the stator core 100 for heat exchange to reduce the temperature of the stator core 100, thereby improving the heat dissipation efficiency of the stator core 100 and prolonging the service life of the disc electric motor.

It should be noted that since the circulation channel is composed of part of the first cavity 600, part of the second cavity 700 and a corresponding oil guide groove 103, the circulation channel has a substantially trapezoidal structure, and the outlet and the inlet of one circulation channel are diagonally arranged, that is, a straight line connecting the outlet of the circulation channel with the inlet of the circulation channel divides the circulation channel into two parts. Diagonal arrangement can reduce the existence of a dead angle in circulation channel.

In the overall direction in which the liquid refrigerant flows in forming multiple circulation channels, the liquid refrigerant flows in from the liquid inlet 301 of the cooling structure for a disc electric motor and flows out from the liquid outlet 302 of the cooling structure for a disc electric motor. Therefore, the overall direction in which the liquid refrigerant flows is directed from the liquid inlet 301 to the liquid outlet 302.

The inlet of the circulation channel or the outlet of the circulation channel is a through hole defined in a corresponding one of the second baffles 500. Alternatively, the inlet of the circulation channel or the outlet of the circulation channel is an opening formed by a corresponding one of the second baffles 500 and an inner wall of the stator housing.

In a case that the number of the circulation channels is two, the first cavity 600 and the second cavity 700 are partitioned by the second baffle, and are in communication with each other only through the oil guide groove 103. The liquid refrigerant flows in and enters part of the first cavity 600 from the liquid inlet, and then enters the second cavity 700 through the oil guide groove. Then the liquid refrigerant enters another part of the first cavity through the oil guide groove, and finally flows out from the liquid outlet.

For example, in a case that the number of the second baffles 500 is six, six circulation channels, including a first circulation channel 801, a second circulation channel 802, a third circulation channel 803, a fourth circulation channel 804, a fifth circulation channel 805 and a sixth circulation channel 806, are formed by separation of the six second baffles 500. The inlet of the first circulation channel 801 is in communication with the liquid inlet 301, and the outlet of the sixth circulation channel 806 is in communication with the liquid outlet 302. The liquid refrigerant first enters the first circulation channel 801 from the liquid inlet 301, then sequentially enters the second circulation channel 802, the third circulation channel 803, the fourth circulation channel 804, the fifth circulation channel 805 and the sixth circulation channel 806, and finally flows out from the liquid outlet 302.

One first baffle 400, two first baffles 400 or three first baffles 400 are spaced between adjacent ones of the second baffles 500.

In an embodiment of the present application, the stator core 100 includes multiple stator teeth 101 and multiple stator slots 102 spaced apart from each other, the coils 200 are wound on the stator teeth, and a gap is formed between adjacent ones of the coils 200. The first cavity 600 and the second cavity 700 may be in communication with each other through the gap. The first baffle 400, when being arranged in a corresponding gap, seals two sides of the gap, so that the liquid refrigerant cannot enter or exit from the gap. The oil guide groove 103 is arranged at the bottom of the gap, that is, the bottom of the stator slot 102. The first cavity 600 and the second cavity 700 can be in communication with each other through the oil guide groove 103, so that the liquid refrigerant can flow in the cooling structure for a disc electric motor in a specific path.

Further, a central surface of the oil guide groove 103 coincides with a central surface of the gap, in other words, a central surface of the oil guide groove 103 coincides with a central surface of the stator slot 102.

The liquid inlet 301 and the liquid outlet 302 are arranged on an outer peripheral surface of the stator housing or an end face of the stator housing.

The stator housing 300 includes an outer stator housing and an outer stator plate, and is used for mounting the stator core 100. The stator core 100 is interposed between the outer stator housing and the outer stator plate, the outer stator housing is arranged on a first end face of the stator core 100, and the outer stator plate is arranged on a second end face of the stator core 100.

In the above structure, the liquid inlet 301 and/or the liquid outlet 302 are arranged on the outer stator housing or the outer stator plate. Preferably, the liquid inlet 301 and the liquid outlet 302 are both arranged on the outer stator housing.

The stator core 100 is a segmented core or an integral core.

A disc electric motor is further provided according to the present application. The disc electric motor includes the cooling structure for a disc electric motor according to any one of the above aspects. In two adjacent cooling structures for a disc electric motor, a liquid outlet 302 of a cooling structure for a disc electric motor is in communication with a liquid inlet 301 of a next cooling structure for a disc electric motor. As the above cooling structure for a disc electric motor has the above advantageous effects, the disc electric motor including the cooling structure for a disc electric motor also has the corresponding effects, which are not repeated here.

The disc electric motor is a single-stator disc electric motor, or a double-stator disc electric motor, or a multi-stator disc electric motor. In two adjacent cooling structures for a disc electric motor, the liquid outlet 302 of the cooling structure for a disc electric motor is in communication with the liquid inlet 301 of the next cooling structure for a disc electric motor through a high-pressure pipe.

The above embodiments in the specification are described in a progressive manner. Each of the embodiments is mainly focused on describing the differences from other embodiments, and reference may be made among these embodiments with respect to the same or similar parts.

According to the above description of the disclosed embodiments, those skilled in the art can implement or practice the present application. Various modifications to these embodiments are apparent for those skilled in the art. The general principles defined herein may be implemented in other embodiments without departing from the spirit and scope of the present application. Therefore, the present application should not be limited to the embodiments disclosed herein, but has the widest scope in accordance to the principle and the novel features disclosed herein.

The invention claimed is:

1. A cooling structure for a disc electric motor, comprising:
a stator core, wherein a plurality of coils are arranged on the stator core, and there is a gap between adjacent ones of the coils;
a stator housing enclosing two end faces of the stator core, wherein a first cavity is defined by the stator housing and an outer side of the stator core, a second cavity is defined by the stator housing and an inner side of the stator core, wherein the first cavity and the second cavity are in communication with each other through the gap, and a liquid inlet and a liquid outlet which are in communication with the first cavity are arranged on the stator housing; and
a plurality of first baffles and a plurality of second baffles, wherein one of the first baffles is arranged in one of the gaps, one of the second baffles is arranged in another of the gaps, an oil guide groove is arranged at the bottom of the gap provided with the first baffle, and one or more of the first baffles are spaced between adjacent ones of the second baffles;
wherein a circulation channel is formed by one or more oil guide grooves arranged between two adjacent ones of the second baffles; wherein the plurality of second baffles separate the first cavity and the second cavity into at least one circulation channel; wherein in one of the at least one circulation channel, an inlet of the circulation channel is arranged diagonally with an outlet of the circulation channel, wherein in an overall direction in which liquid refrigerant flows in forming a plurality of circulation channels, an inlet of a circulation channel, arranged at an initial end, of the plurality of circulation channels is in communication with the liquid inlet, an outlet of a circulation channel, arranged at a tail end, of the plurality of circulation channels is in communication with the liquid outlet, and an outlet of a circulation channel of the circulation channels is an inlet of a next circulation channel.

2. The cooling structure for a disc electric motor according to claim 1, wherein the inlet of the circulation channel or the outlet of the circulation channel is a through hole defined in a corresponding one of the second baffles.

3. The cooling structure for a disc electric motor according to claim 1, wherein the inlet of the circulation channel or the outlet of the circulation channel is an opening formed by a corresponding one of the second baffles and an inner wall of the stator housing.

4. The cooling structure for a disc electric motor according to claim 1, wherein a central surface of the oil guide groove coincides with a central surface of a corresponding gap of the gaps.

5. The cooling structure for a disc electric motor according to claim 1, wherein the number of the plurality of second baffles is six, six circulation channels, comprising a first circulation channel, a second circulation channel, a third circulation channel, a fourth circulation channel, a fifth circulation channel and a sixth circulation channel, are formed by separation of the six second baffles, an inlet of the first circulation channel is in communication with the liquid inlet, and an outlet of the sixth circulation channel is in communication with the liquid outlet.

6. The cooling structure for a disc electric motor according to claim 1, wherein two of the first baffles are spaced between two adjacent ones of the second baffles.

7. The cooling structure for a disc electric motor according to claim 1, wherein the liquid inlet and the liquid outlet are arranged on an outer peripheral surface of the stator housing.

8. The cooling structure for a disc electric motor according to claim 1, wherein the stator core is a segmented core.

9. A disc electric motor, comprising at least two cooling structures for a disc electric motor according to claim 1, wherein in two adjacent ones of the cooling structures for a disc electric motor, a liquid outlet of a cooling structure for a disc electric motor is in communication with a liquid inlet of a next cooling structure for a disc electric motor.

10. The disc electric motor according to claim 9, wherein in the two adjacent ones of the cooling structures for a disc electric motor, the liquid outlet of the cooling structure for a disc electric motor is in communication with the liquid inlet of the next cooling structure for a disc electric motor through a high-pressure pipe.

11. The disc electric motor according to claim 9, wherein the inlet of the circulation channel or the outlet of the circulation channel is a through hole defined in a corresponding one of the second baffles.

12. The disc electric motor according to claim 9, wherein the inlet of the circulation channel or the outlet of the circulation channel is an opening formed by a corresponding one of the second baffles and an inner wall of the stator housing.

13. The disc electric motor according to claim 9, wherein a central surface of the oil guide groove coincides with a central surface of a corresponding gap of the gaps.

14. The disc electric motor according to claim 9, wherein the number of the plurality of second baffles is six, six circulation channels, comprising a first circulation channel, a second circulation channel, a third circulation channel, a fourth circulation channel, a fifth circulation channel and a sixth circulation channel, are formed by separation of the six second baffles, an inlet of the first circulation channel is in communication with the liquid inlet, and an outlet of the sixth circulation channel is in communication with the liquid outlet.

15. The disc electric motor according to claim 9, wherein two of the first baffles are spaced between two adjacent ones of the second baffles.

16. The disc electric motor according to claim 9, wherein the liquid inlet and the liquid outlet are arranged on an outer peripheral surface of the stator housing.

\* \* \* \* \*